United States Patent Office — 3,553,130, Patented Jan. 5, 1971

3,553,130
OIL RECOVERY

Charles A. Stratton, Copan, Okla., assignor to Phillips Petroleum Company, a corporation of Delaware
No Drawing. Original application Oct. 26, 1966, Ser. No. 589,522, now Patent No. 3,401,748, dated Sept. 17, 1968. Divided and this application May 20, 1968, Ser. No. 730,613
Int. Cl. E21b 43/22, 43/20
U.S. Cl. 252—8.55                                    3 Claims

ABSTRACT OF THE DISCLOSURE

An additive for an aqueous fluid used in recovering oil from a formation comprising a mixture of ethylene oxide adducts of alkyl phenols.

---

This application is a division of application Ser. No. 589,522, filed Oct. 26, 1966 now Pat. No. 3,401,748.

This case relates to a new and improved method for recovering oil from geological formations. This invention also relates to a new and improved additive for use in fluids used to recover oil from geological formations. This invention also relates to a new and improved fluid for recovering oil from geological formations.

Heretofore it has been known to add detergent to waterflood brine in order to increase the amount of oil recovered by the subterranean geological formations being waterflooded. Among the detergents used have been ethylene oxide adducts of octyl or nonyl phenols wherein the number of ethylene oxide units per molecule varies up to 100.

Also heretofore, it was thought in order to get a good displacement of oil by use of waterflood techniques, the ethylene oxide adducts of alkyl phenols employed had to have from 6 to 9, preferably 6 to 8, ethylene oxide units per molecule.

Very surprisingly, it has now been found that ethylene oxide adducts of octyl and nonyl phenols that have ethylene oxide units outside of the 6 to 9 range heretofore thought necessary can be used and are very effective in displacing oil from a formation if a mixture of at least 1 adduct having from 1½ to 5 ethylene oxide units per molecule is mixed with another adduct having from 9½ to 100 ethylene oxide units per molecule.

Thus, this invention relates to a method for recovering oil from a formation by conventional waterflood techniques modified by the incorporation in the waterflood liquid of the mixture of this invention.

This invention also relates to the specific mixture of adducts as discussed hereinabove as an additive for the waterflood fluid.

This invention also relates to the additive of the invention incorporated in a waterflood fluid.

The process, mixture of adducts, and additive of this invention are all useful in recovering oil from subterranean geological formations.

Accordingly, it is an object of this invention to provide a new and improved method of recovering oil from a geological formation. It is another object of this invention to provide a new and improved additive for use in waterflood techniques. It is another object of this invention to provide a new and improved waterflood fluid.

According to this invention ethylene oxide adducts of alkyl phenols have the following formula

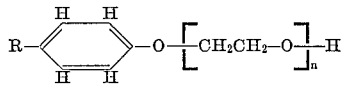

wherein R is an octyl radical ($C_8H_{17}$) or nonyl radical ($C_9H_{19}$) and $n$ varies with the component of the mixture of the invention.

According to this invention at least one component of the mixture employs an adduct within the scope of the above-disclosed formula wherein the value for $n$ is in the range of from 1.5 to 5, preferably 3 to 5, still more preferably, 4 and 5; and at least one other component in the mixture employs an adduct within the scope of the above-disclosed formula wherein $n$ has a value in the range of from 9.5 to 100, preferably 9.5 to 15. The preferred ranges of 3 to 5 and 4 and 5 together with the preferred range of 9.5 to 15 for at least two adducts of the mixture of this invention are preferred, especially in combination with each other because the best results are obtained by the combination of these limited ranges especially when the minimum $n$ value of 3 or 4 for one adduct is combined with an adduct of a maximum $n$ value of 15 as will be seen from the data hereinafter.

The adducts used in the mixture of this invention are well known and readily available commercially. For example, ethylene oxide adducts of nonyl phenols having varying numbers of ethylene oxide unit are available commercially under the Triton N series from the Rohm and Haas Company, Philadelphia, Pa., and also under the name "Igepal" available from General Aniline Film Corporation, Dyestuff and Chemical Division and also from Antara Chemicals. Also, ethylene oxide adducts of octyl phenols are available commercially under the Triton X series of Rohm and Haas. Also, these compounds are readily made by one skilled in the art with techniques well known in the art and therefore, for the sake of brevity and clarity, these known techniques will not be discussed in detail.

The additive mixture of this invention is formed from at least one of the above adducts having an $n$ value in the range of 1.5 to 5 and at least one of the above adducts having an $n$ value in the range of 9.5 to 100, mixtures of two or more of each of the adducts presently being feasible. Generally, the amount of each adduct employed in the additive mixture will only be that which is effective in increasing the displacement of oil from a formation but will usually be in the range of from about 25 to about 75 weight percent for the adduct or adducts having an $n$ value in the range of 1.5 to 5, the remaining 25 to 75 weight percent being formed essentially from an adduct or adducts having an $n$ value in the range of 9.5 to 100, all weight percents being based on the total weight of the additive mixture of adducts.

Generally any conventional waterflooding fluid can be employed, these fluids generally being an aqueous material containing various dissolved materials, primarily inorganic salts such as sodium chloride, calcium chloride, magnesium chloride, and the like. Generally, any aqueous fluid useful for waterflooding techniques can be employed along with the additive mixture of this invention. Generally, the additive mixture of this invention will be employed in the waterflooding fluid in an amount effective to increase the oil recovery capabilities of the water of that particular waterflood fluid but generally the amount of additive mixture employed will vary from about 0.005 to about 5, preferably from about 0.01 to about 1, weight percent based on the total weight of the waterflood fluid.

Other conventional additives normally used in the waterflood fluid can be employed in that fluid along with the additive mixtures of this invention. Also, the waterflood fluid containing the additive mixture of this invention can be used in the waterflooding technique in any conventional manner known in the art.

The additive mixture of this invention and the blend of the additive mixture of this invention with the waterflooding fluid can be made in any conventional manner by mechanically stirring the ingredients at room or an elevated temperature under ambient pressures for any desired length of time.

EXAMPLE I

Igepal CO 530, a mixture of ethylene oxide adducts of nonyl phenols, the mixture having an average $n$ value of 6 was fractionated into fractions of varying values. In the fractionation procedure, a cylindrical glass column having a fritted glass support tray and stopcock on the bottom and a liquid reservoir fitted to the top thereof and being six centimeters in diameter and 127½ centimeters in height was filled with particulate "Amberlite XAD–1" resin (a cation- and anion-exchange resin marketed by the Rohm & Haas Company) by suspending the resin in a 55/45 volume percent acetone/water mixture and pouring the resin suspension into the column. Thereafter, acetone solution was drawn off the bottom of the column until the acetone solution in the column was about down to but still above the top of the resin in the column.

Twenty-five grams of "Igepal CO 530" was dissolved in the 55/45 volume percent acetone/water solution and the "Igepal" solution poured into the top of the column, the column and "Igepal" solution being at room temperature. The acetone solution was then drawn off the bottom of the column to draw the "Igepal" solution down to the level of the top of the resin in the column. The reservoir at the top of the column was then filled with 55/45 acetone/water solution.

Thereafter, 100 ml. fractions were drawn off from the bottom of the column at a rate of 2 to 3 seconds per drop of solution from the column. Each 100 milliliter fraction was retained in a separate beaker. After the thirty-first 100 milliliter fraction had been withdrawn a 60/40 volume percent of acetone/water was added to the reservoir of the column in order to move down the less hydrophilic fractions remaining in the column. After the ninety-fifth 100 milliliter fraction was withdrawn a 70/30 volume percent acetone/water solution was added to the top of the reservoir of the column. After the one-hundred-tenth 100 milliliter fraction and 80/20 volume percent acetone/water solution was added to the reservoir at the top of the column. One-hundred-eighteen 100 milliliter fractions were withdrawn.

Thereafter, each fraction was evaporated to dryness by heating on a hot plate under the rays of a heat lamp.

The thirty-eighth, forty-eighth, fifty-eighth, sixty-eighth, and seventy-eighth fractions were analyzed using conventional microcombustion tube techniques for their carbon, hydrogen, and oxygen contents. The carbon, hydrogen, and oxygen contents for ethylene oxide adducts of nonyl phenols having $n$ values of 5, 6, 8, 11, and 13 were calculated and the results of the analyses of the fractions and the calculations were as follows:

TABLE I

| $n$ | Calculated, wt. percent | | | Fraction | Found, wt. percent | | |
|---|---|---|---|---|---|---|---|
| | C | H | O | | C | H | O |
| 13 | 62.1 | 9.6 | 28.3 | 38 | 62.3 | 9.6 | 28.1 |
| 11 | 63.0 | 9.7 | 27.3 | 48 | 63.2 | 9.8 | 27.0 |
| 8 | 65.0 | 9.8 | 25.2 | 58 | 65.0 | 10.1 | 24.9 |
| 6 | 67.0 | 9.9 | 23.1 | 68 | 66.8 | 10.2 | 23.0 |
| 5 | 68.2 | 10.0 | 21.8 | 78 | 68.4 | 10.3 | 21.3 |

As can be seen from the above table, fractions 48 and 78 had carbon, hydrogen, and oxygen contents equivalent to ethylene oxide adduct with nonyl phenols having 11 and 5 ethylene oxide units, respectively.

Because fractions 48 and 78 were used up in the elemental analysis procedure, fractions 49 and 77 were employed in the remaining procedure of this example because due to the large number of samples taken, fraction 49 would have an elemental analysis substantially the same as fraction 48 and therefore would have an $n$ value of substantially 11 while fraction 77 would have an elemental analysis substantially the same as that of fraction 78 and therefore have an $n$ value of substantially 5.

0.27 gram of fraction 49 was dissolved in 26.73 grams of a simulated flood water brine formed by adding to 18 liters of water 725.4 grams of sodium chloride, 190.3 grams of calcium chloride, and 85.7 grams of magnesium chloride containing 6 molecules of hydration.

Similarly, 0.31 gram of fraction 77 was dissolved in 30.69 grams of the same simulated flood water brine. The two solutions of fractions 49 and 77 were then mechanically mixed together and a microslide test was run using Burbank sand containing Burbank oil. The Burbank sand and Burbank oil are obtained from the Burbank Field in Osage and Kay Counties, Okla. The Burbank oil generally has a specific gravity of 0.835 at 78° F. or 38 API and a viscosity of 6.8 centipoises at 78° F.

The sand is obtained by disintegrating Burbank oils and separating the oil-wet part by froth flotation using a native crude oil in the froth flotation as collector and frother. The particle size of the sand used for microslide testing is in the range of 250 to 350 microns.

The microslide test is carried out at room temperature using a microcell formed from two 3" x 1" standard microscope slides having their sides of largest area spaced parallel to one another and their longitudinal axes parallel to one another. The two slides are spaced 15 mils apart from one another by a flat polyethylene bar 15 mils thick and 1/16 inch wide. The slides are glued together at the edges with epoxy resin, the 15 mil space therebetween being filled with Burbank sand. Hypodermic needles pierce opposite ends of the microcell so that liquid can be introduced into one end of the cell and withdrawn from the other end.

The microcell filled with Burbank sand was then injected with 0.5 milliliters of Burbank oil, allowed to sit overnight at room temperature. Thereafter, the microcell was flooded with the above-described flood water brine devoid of any detergent additive using 3 milliliters of flood water brine injected at a rate of 0.1 milliliters per minute to simulated waterflooding of the sand.

Thereafter, the flood water brine solution containing both fractions 49 and 77 was injected into the microcell in the amount of 3 milliliters and at the rate of 0.1 milliliter per minute. During the injection of the flood water brine containing the mixture of fractions 49 and 77 the microcell was observed under a microscope to determine what happens to the residual oil in the interstices between the sand particles and clinging to the surface of and pores in the sand particles themselves.

The same microslide technique was employed for fractions 48, 58, 68 and 78.

The results of all these tests are as follows:

TABLE II

| | $n$ value for ethylene oxide units | Observed results |
|---|---|---|
| Fraction: | | |
| 48 | 11 | No oil displacement. |
| 58 | 8 | Very active oil displacement. |
| 68 | 6 | Substantially no oil displacement. |
| 78 | 5 | Do. |
| Mixture of 49 and 77 | (¹) | Very active oil displacement. |

¹ Mixture of 5 and 11.

Thus, it can be seen that from a mixture of two detergent fractions, i.e. a fraction having an $n$ value of 5 and another fraction having an $n$ value of 11, neither of which cause oil displacement when employed by itself, very active oil displacement was realized. Thus, by mixing two ethylene oxide adducts of nonyl phenols, each adduct having $n$ values for the ethylene oxide unit outside of the range heretofore thought necessary for oil displacement, a very active oil displacement additive for waterflood fluid is obtained.

EXAMPLE II

The same microslide technique disclosed in Example I was employed in various "Igepal" detergents composed of ethylene oxide adducts of nonyl phenols, the differences between the detergents being the average $n$ value for the ethylene oxide unit. The results of the tests are as follows:

TABLE III

| Detergent | Average $n$ | Oil displacement action |
|---|---|---|
| Igepal CO 210 | 1.5 | None. |
| Igepal CO 430 | 4 | Do. |
| Igepal CO 530 | 6 | Good. |
| Igepal CO 610 | 9 | Slight. |
| Igepal CO 630 | 9.5 | Do. |
| Igepal CO 710 | 10.5 | None. |
| Igepal CO 730 | 15 | Do. |
| Igepal CO 850 | 20 | Do. |
| Igepal CO 880 | 30 | Do. |
| Igepal CO 890 | 40 | Do. |
| Igepal CO 990 | 100 | Do. |

Equal weight mixtures of various detergents of Table III were made and one weight percent solutions of these mixtures in the waterflood brine used in Example I were made. Thereafter, the microslide technique of Example I was carried out using one weight percent solutions of 50/50 mixtures of detergents and the oil displacement action observed. The results of these tests were as follows:

TABLE IV

| Mixture | Oil displacement action |
|---|---|
| Igepal CO 430 ($n=4$) and CO 610 ($n=9$) | Substantially none. |
| Igepal CO 430 and CO 630 ($n=9.5$) | Best displacement of Tables III and IV. |
| Igepal CO 430 and CO 710 ($n=10.5$) | Very vigorous. |
| Igepal CO 430 and CO 730 ($n=15$) | Good. |
| Igepal CO 430 and CO 850 ($n=20$) | Some. |
| Igepal CO 430 and CO 990 ($n=100$) | Do. |

From Table IV it can be seen that mixtures of an adduct having an $n$ value of 4 with adducts having $n$ values varying from 9.5 to 100 all gave oil displacement to varying degrees.

EXAMPLE III

Two additional equal weight mixtures of detergents were made and converted into one weight percent solution in the waterflood brine of Example I. The detergents used were ethylene oxide adducts of nonyl phenols with varying $n$ values for the ethylene oxide units. The three detergents were Igepal CO 210 having an $n$ value of 1.5, Igepal CO 710 having an $n$ value of 10.5, and Igepal CO 730 having an $n$ value of 15. One mixture was composed of Igepal CO 210 and CO 710 while the other mixture was composed of Igepal CO 210 and CO 730.

The same microslide technique as set forth in Example I was employed using the two mixtures in the simulated waterflood brine and the results of the tests are as follows:

TABLE V

| Mixture | Oil displacement action |
|---|---|
| Igepal CO 210 ($n=1.5$) and CO 710 ($n=10.5$) | Very active. |
| Igepal CO 210 and CO 730 ($n=15$) | Substantially none. |

From Table V it can be seen that a specific combination of detergents is necessary to effect the results of this invention.

Reasonable variations and modification are possible within the scope of this diclosure without departing from the spirit and scope thereof.

That which is claimed is:

1. A mixture disposed in an aqueous fluid in an amount sufficient to increase the recovery of oil from a formation by the injection therein of said aqueous fluid, said mixture consisting of compound A having the formula

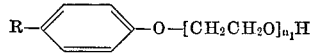

and compound B having the formula

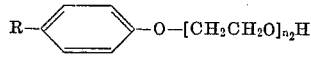

wherein R is nonyl; said mixture being formed from one combination of A and B wherein (a) $n_1$ is 1.5 and $n_2$ is 10.5; (b) $n_1$ is 4 and $n_2$ is 9.5; (c) $n_1$ is 4 and $n_2$ is 10.5; (d) $n_1$ is 4 and $n_2$ is 15, and (e) $n_1$ is 5 and $n_2$ is 11; and further wherein compound A is present in said mixture in the amount of 25 to 75 percent by weight of the total weight of said mixture and compound B is present in said mixture in the amount of 25 to 75 percent by weight of the total weight of said mixture.

2. The mixture of claim 1 wherein said compound A and said compound B are present in said mixture in 50 percent by weight proportions and wherein said mixture is disposed in said aqueous fluid in the amount of one percent by weight based on the total weight of said aqueous fluid.

3. A mixture disposed in an aqueous fluid in an amount sufficient to increase the recovery of oil from a formation by the injection therein of said aqueous fluid, said mixture consisting of a first compound of the formula

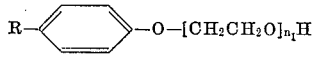

and a second compound of the formula

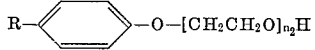

wherein R is one of octyl and nonyl radicals, $n_1$ has a value in the range from 4 to 5, and $n_2$ has a value in the range from 9.5 to 15; and further wherein said first compound is present in said mixture in the amount of 25 to 75 percent by weight of the total weight of said mixture and said second compound is present in said mixture in the amount of 25 to 75 percent by weight of the total weight of said mixture.

References Cited

UNITED STATES PATENTS

| | | | |
|---|---|---|---|
| 2,851,105 | 9/1958 | Garst | 252—8.55X |
| 3,082,822 | 3/1963 | Holm et al. | 252—8.55X |
| 3,096,820 | 7/1963 | Bernard | 166—9 |
| 3,236,769 | 2/1966 | Burdyn et al. | 252—8.5 |
| 3,282,843 | 11/1966 | Alburger | 252—351 |

OTHER REFERENCES

Johansen et al., "Detergents for Petroleum Displacement," Soap and Chemicals Specialties, vol. 31, No. 10, October 1955, pp. 41 to 44, 79 and 81.

HERBERT B. GUYNN, Primary Examiner

U.S. Cl. X.R.

166—275; 252—351